Sept. 5, 1933.   R. DUBOIS   1,925,483
ELECTRICAL RECORDER
Filed July 6, 1931   3 Sheets-Sheet 1
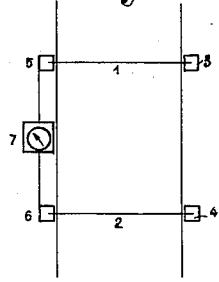
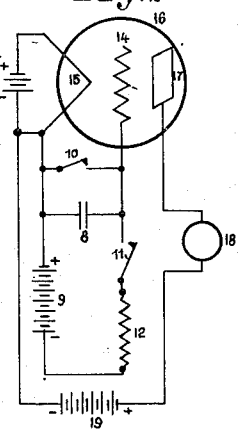
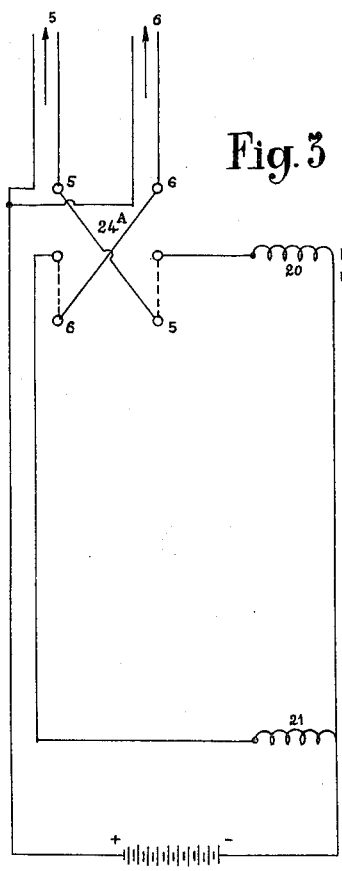
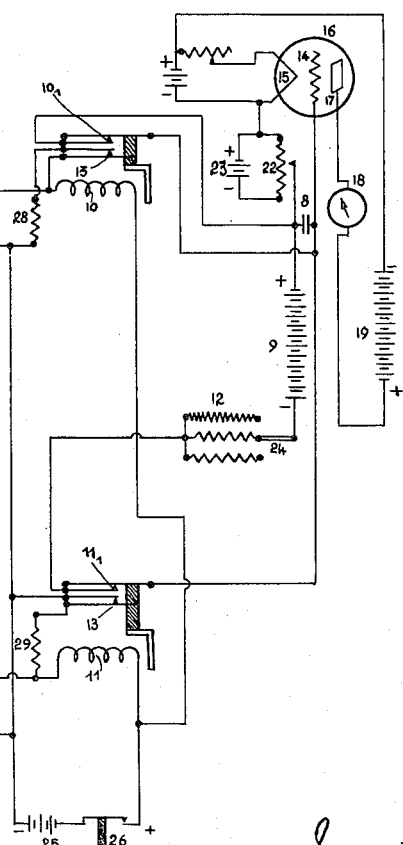
Inventor,
Raymond Dubois,
By Sommers & Young Attys.

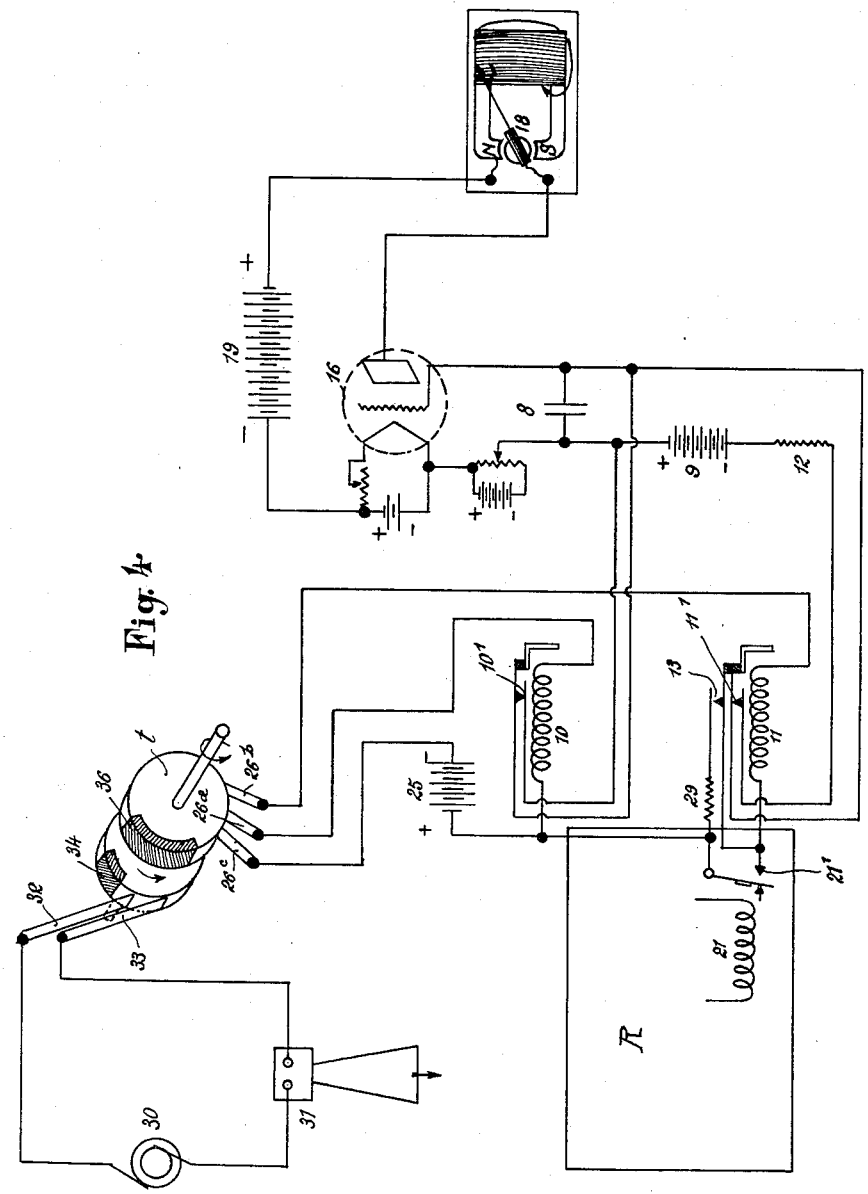

Sept. 5, 1933.   R. DUBOIS   1,925,483
ELECTRICAL RECORDER
Filed July 6, 1931   3 Sheets-Sheet 3

Patented Sept. 5, 1933

1,925,483

UNITED STATES PATENT OFFICE 1,925,483

ELECTRICAL RECORDER

Raymond Dubois, Asnieres, France, assignor to Société Cema, Constructions Electro Mecaniques d'Asnieres (Société Anonyme), Asnieres-Seine, France Application July 6, 1931, Serial No. 549,031, and in France July 12, 1930

4 Claims. (Cl. 234—36.5)

This invention relates to an apparatus for measuring the speed of a movable body between two predetermined points.

It comprises essentially two visible or invisible light bundles (ultra-violet or infra-red rays) which are successively cut by the passage of a vehicle and an electric device to measure the interval of time between the beginning of the two occultations, said device comprises, an index moving upon a dial, which starts at the beginning of the first occultation and stops at the beginning of the second having travelled a distance which measures the duration of the time that has elapsed.

When the base or distance between the two light bundles always remains the same the graduation of the measuring apparatus may be made in "speed" instead of being in "time".

The chronographical device is itself characterized in that it comprises a condenser charged negatively through a high resistance by the action of a constant potential difference from the beginning to the end of the time, the tension of said condenser which is applied between the filament and the grid of a triode lamp in which the subsequent voltage regulation, indicated by a milliamperemeter is function of the charging time and consequently of the time taken by the vehicle to cover the distance between the two points.

Another characteristic of said device is that the insulation of the condenser has been raised to a high value in order that the charge of said condenser may be maintained a long time without alteration this allowing of reading the indication in full security.

According to a modified form of execution the device is also characterized in that it comprises a set of resistances and a set of condensers capable of being put in circuit separately so as to be able to modify at a given ratio the indication given by the milliamperemeter.

The present invention has also for its object a chronographic device of the kind in which the milliamperemeter that translates the anodic current variations is a recording milliamperemeter, and the relay circuits utilized for loading and for interrupting the latter are produced by a rotary contact maker thus allowing the production of an uninterrupted line recording the time periods (or values proportionate to time) which elapse between the workings of the relays caused by any kind of event, for example by the emission of a sound and its subsequent reception. The various heights of an airship above the ground or of a submarine above the bottom of the sea may thus be recorded.

Fig. 1 of the annexed drawings shows diagrammatically the whole of the tachymeter.

Fig. 2 is a diagram of the chronographic device.

Fig. 3 is a detail view of same showing the relays which are operated by occultation of the light bundles in an inoperative position.

Fig. 4 is a diagrammatical view showing the chronographical device with recording milliamperemeter in combination with an apparatus for aerial or submarine sounding apparatus.

Figure 5:
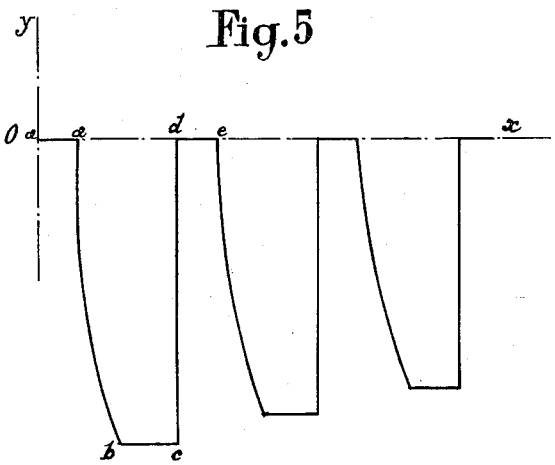
Fig. 5 shows an elementary record.

Lines 1, 2, Fig. 1, show the paths of the light bundles which are occulted by the passage of the vehicle; 3, 4 are the emitting devices which produce said bundles; 5, 6 indicate the photoelectrical receivers which cause the closing of a relay at every disappearance of the light bundle. The emitting and receiving devices may be of any well-known type.

In apparatus of this type the receiver generally comprises a photoelectric cell connected with a source of electric current and with a triode lamp in such a manner that according to the system of connection used the occultation of the emitting bundle causes the increase or the decrease of the anodic current which is directed upon a relay actuated by said increase or decrease. Said relays 20, 21 (Fig. 3) which are connected with the receivers 5, 6 are actuated by a decrease of the current, that is, the relays are arranged to normally attract their armatures and release them through a diminution of the current. The present apparatus utilizes the law that governs the charge of a condenser through a high resistance under the action of a constant difference of potential.

The condenser 8 may be short circuited by the contact $10^1$ of a relay 10. When the relay is excited this contact opens and the condenser is charged by the effect of the electromotive force of a battery 9 to which it is connected by the intermediary of a high resistance 12 of which the value as well as that of the condenser is chosen so as to give to the circuit a time constant corresponding to the longest periods to be measured.

The connection between the condenser and the charging current may be made by the opening of the contact $11^1$ of a relay 11.

The relays 10, 11 are excited when their circuit is closed through a source 25 having a sufficiently high tension to cause them to operate with great rapidity.

The closing of the circuit relay 10 is controlled by a relay 20 actuated by the receiver 5. In the same manner electric current is fed to the relay 11 through the relay 21 actuated by the light bundle receiver 6.

Considering that the vehicles may drive in any direction a switch 24A has been provided to interchange the connections of the two bars so as to restore the normal closing order of the relays 10, 11 which limit the beginning and the end of the time interval.

When said relays 10, 11 are fed by the relays 20, 21 and draw their armature, they open, the one the contact $10^1$ and the other the contact $11^1$. At the same time each one of them closes an auxiliary contact 13 which is a re-feeding contact so that each relay is maintained respectively excited by a weaker constant current of which the value is limited by a resistance in series- 29 for relay 10, and 22 for relay 11.

The passage of the current to both relays may be closed simultaneously by means of a switch so as to bring them back to their starting position.

It is to be noted that the units formed by the relays 10 and 20 on the one part and 11, 21 on the other part are quite similar as regards their constitution, it will be therefore easy to regulate them in such a manner that the delays that they produce are closely related, so that the accuracy of the limitation of the time interval may be very superior to the value of the delay produced separately by each of said units.

The condenser 8 is interposed between the grid 14 and the filament 15 of a triode 16. Said lamp must be suitably insulated and its vacuum must be very thorough so that the contrary grid current may be neglected. The anode 17 of said triode is connected by means of a milliamperemeter 18 to the positive pole of an anodic tension battery 19.

It has been found advantageous to connect one of the armatures of the condenser to the sliding part of the potentiometer 22 fed under a few volts by a cell 23, this allowing of making said armature slightly more negative than the filament, Fig. 3, instead of connecting it directly to the negative end of the filament.

In that case it is possible by a suitable regulation of said sliding part to always bring back the anodic current to the same original value when the condenser is short circuited. The small variations in the anodic tension may thus be corrected whatever their origin may be.

On the other hand the use of a slightly negative grid tension eliminates all irregularities due to variations in the grid current near the zero tension.

The battery 9 is placed in such a manner that the condenser electrode connected to the grid is made negative.

In these conditions as soon as the relay 10 drawing its armature opens the contact $10^1$ the condenser is no longer short circuited but is charged negatively because the relay 11 which is then inoperative closes the charging circuit, consequently the grid potential decreases gradually owing to said negative charge. When the relay 11 is drawn the charging ceases immediately.

The insulation of the lamp grid condenser and of its connections being considerably raised (1.000 megohms at least) the condenser charge remains for a long time without alteration that is up to several minutes. The grid potential remaining constant during the same period, the indication of the anodic milliamperemeter remains also unchanged. The reading of the position of the index upon the scale will therefore be easy.

The displacement of the index measures the fall of the anodic current and consequently the charge of the condenser. Said charge being an exponential function of time which may be wholly calculated beforehand when the characteristic of the lamp, the charging resistance and the capacity of the condenser are known, there will not be any difficulty to graduate the milliamperemeter in intervals of time.

When substituting to the present condenser another condenser having a value N times greater or smaller the scale may be instantaneously changed in the same proportion. Likewise the substitution of a resistance M times higher multiplies the periods pointed out by the index by the same number M.

The change of scale may thus be effected very simply by the use of a controller provided with several contacts 24 which allows of replacing the charging resistance by a more appropriate one. A similar means not shown would be just as suitable for the utilization of a whole scale of condensers.

It will easily be seen that the chronographic system which has just been described and which has been devised in view of its application to a speed measure may be adapted without any difficulty to every measure of interval of time or of speed in which the phenomena which determine the beginning and the end of the period are liable to be produced electrically so as to cause the closing of the relays 10 and 11.

It will also be possible to apply the present chronographical system with the object of ascertaining the interval of time which lapses between the production of a sound and the return of its echo against an obstacle, this allowing the execution of sounding operations by sound or by ultra sound either in the air or in the water.

The milliamperemeter may in all cases be graduated by calculation starting from the constants of the condenser circuit, and it will be possible to graduate the apparatus either in time intervals or in depths, in the case of sounding operations or, also in speeds in the case of a tachymetrical application.

Figure 6:
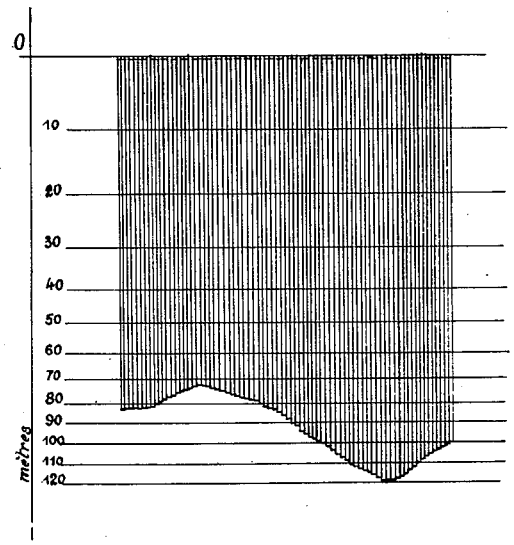
Fig. 6 shows the graph of the continuous record.

Figs. 4 and 6 to show another mode of execution of the chronographic device as applied to an aerial or submarine sounding apparatus with the object of giving a continuous record of the sounding.

In this case it has been supposed that the sounding apparatus works regularly that is that the sound emissions follow successively at a regular rhythm. In this apparatus an alternator 30 causes a short sound to be sent by the emitter 31 when two contact blades 32—33 are conductively assembled by the passage under them of a metal sector 34 embedded in an insulating drum that rotates at a suitable speed which may be advantageously regulated according to the depths which are being recorded.

During emission a second conducting sector 36 comes under the blades $26^c$ and $26^a$ and thus closes the circuit of the starting relay 10 of the chronograph which opens the contact 10.

The length of the sector 36 is such that the relay 10 remains excited (the chronographical condenser 8 is un-shortcircuited) during a time which allows of receiving the echoes rising from the greatest depths to be measured.

Shortly after its engaging under the blades $26^c$,

26ª, the sector 36 reaches the blade 26ᵇ which allows the relay to come into action when the echo received by the receiver R frees the relay 21 the armature of which bears upon 21¹.

As soon as the relay 11 has been opened by the contact 11¹, it stops the charging of the condenser 8 which was taking place through resistance 12 through the action of battery 9. At the same time the contact 13 which is closed allows this relay to be fed again through a resistance 29 which limits the current coming from battery 25 to the required value.

The operation of the chronographical condenser 8 and of the lamp 16 is the same as before. The vacuum tube measures continuously the state of charge of the condenser and the anodic current delivered by battery 19 through the measuring apparatus 18 has a value which decreases with the negative charge which has been acquired by the condenser, or what comes to the same, with the time during which the charging takes place.

Consequently the current measured by the milliamperemeter 18 varies from a constant initial value corresponding to the zero charge of the condenser up to a value which is characteristic of the charging time and it retains this value, which gives the desired indication of the period of time, owing to the very good insulation of condenser 8, until both relays 10, 11 are no longer excited this being the case when the sector 36 frees the blade 26ᶜ. The contact 10¹ then closes and closes again the short circuit that unloads the condenser 8 while the contact 11¹ closes and closes again the circuit which will subsequently allow of charging through resistance 12. The electric current in the apparatus 18 acquires again immediately its original value. The milliamperemeter will be selected so as to have a relatively short period and sufficient damping to allow a relatively great frequency of working.

During one turn of the contact maker t, the electric current in 18 varies consequently in the measure indicated in Fig. 5.

The portions a—a, d—e indicate the value of the initial current (8 being unloaded). Part a—b indicates the current variation during the loading of the condenser from the moment when the relay 10 is excited owing to the emission of a signal (point a) up to the moment when the relay has worked (point b) owing to the reception of the echo.

The plane b c represents the value of the anodic current corresponding to the charging tension acquired by the condenser 8. Point c corresponds to the moment when the blade 26ᶜ being no longer in engagement with the sector 36 the relays 10, 11 are no longer excited, this causing the unloading of condenser 8 and bringing it back instantly to its original state in which it remains until a new signal is emitted at e.

It will be seen that the use of a recording milliamperemeter 18 as measuring apparatus, will allow of obtaining, (the recording paper being graduated in meters travelled by the echo) a graph of the kind shown in Fig. 6 in which the portions a—a, d—e, form a dotted starting line (distance zero) and the portions b—c a recording pointed line recording the various distances of the echo (depths or altitudes) reached in the course of time.

The paper being unwound by clockwork, the abscissæ indicate the various moments of recording and the ordinates give the distances of the echoes obtained at said moments.

The curved lines a, b, c, d are traced essentially as verticals by the recording milliamperemeter.

According to the type of milliamperemeter the record will be obtained immediately as rectilinear coordinates, as curvilinear coordinates or as polar coordinates.

Fig. 6 is drawn supposing a record with rectilinear coordinates.

What I claim and desire to secure by Letters Patents of the United States is:

1. Apparatus for measuring the speed of a moving body between two predetermined points of its trajectory, which comprises: two light bundles crossing said trajectory at these points, each bundle being placed between an emitter and a receiver and being provided with a relay and with means through which said relay is released when the corresponding luminous bundle is occulted; a condenser; a charging circuit constituted by a source of electric current; a resistance mounted in series for said condenser; a contact designed to short circuit said condenser when the contact is closed; a relay to open said contact and keep it open, said relay being operated by the relay of the receiver of the first aforesaid light bundle; a second contact in the condenser charging circuit to close and open said circuit, a relay to open said contact and keep it open, said relay being operated by the receiver relay of the aforesaid second light bundle; a triode lamp with filament, grid and plate, said condenser being interposed between the filament and the grid of said triode, and a milliamperemeter in the plate-circuit of said lamp to measure the variation of anodic tension obtaining during the loading of the condenser between the opening of the first contact brought about by occultation of the first light bundle and the opening of the second brought about by occultation of the second light bundle, said variation being function of the time that elapses between the occultations; said amperemeter being provided with a speed gradation devised in function of said time, taking into account the distance between both points of the trajectory of the moving body.

2. A chronographical apparatus which comprises: a condenser, a charging circuit constituted by a source of electric current and a resistance mounted in series for said condenser; a contact arranged to shortcircuit said condenser when closed; a relay to open said contact and keep it open; a second contact in the charging condenser circuit to close and open said circuit; a second relay to open the second contact and keep it open; means to operate the first relay and means to operate the second; a triode lamp with filament, grid and plate, said condenser being interposed between the filament and the grip of said triode; and a milliamperemeter in the plate circuit of said lamp designed to measure the variation of anodic tension produced during the charging of the condenser between the opening of the first contact and the opening of the second contact, said variation being function of the time which divides the release of the driving relays of said contacts.

3. A chronographical apparatus which comprises: a condenser, a charging circuit constituted by a source of electric current and a resistance mounted in series for said condenser; a contact arranged to shortcircuit said condenser when closed, a relay to open said contact and keep it open; a second contact in the charging condenser circuit to close and open said circuit; a second relay to open the second contact and keep it open; means to operate the first relay and means to operate the second; a triode lamp with filament, grid and plate, said condenser being interposed between the filament and the grid of said triode, and a milliamperemeter in the plate circuit of said lamp designed to measure the variation of anodic tension produced during the charging of the condenser between the opening of the first contact and the opening of the second contact, said variation being function of the time which divides the release of the driving relays of said contacts, the condenser having such a high capacity and being mounted with an insulation having such a high resistance that the indication given by the milliamperemeter remains unchanged during a long time.

4. A chronographical apparatus which comprises: a condenser, a charging circuit constituted by a source of electric current and a resistance mounted in series for said condenser; a contact arranged to shortcircuit said condenser when closed; a relay to open said contact and keep it open; a second contact in the charging condenser circuit to close and open said circuit; a second relay to open the second contact and keep it open; means to operate the first relay and a rotary contactor for operating the first relay simultaneously with the occurrence of a phenomenon, means to close the circuit of the second relay at the instant of the occurrence of a second phenomenon following the first, a triode lamp with filament, grid and plate, said condenser being interposed between the filament and the grid; and a recording milliamperemeter in the plate circuit of said lamp designed to record the anodic current variations which are produced every time during the time of charging of the condenser that is during the succeeding time intervals that elapse between two repeated phenomena.

RAYMOND DUBOIS.